United States Patent [19]

Yamada et al.

[11] Patent Number: 4,644,414
[45] Date of Patent: Feb. 17, 1987

[54] HELICAL SCAN MAGNETIC RECORDING AND REPRODUCTION SYSTEM WITH HEAD POSITION CONTROL

[75] Inventors: Koichi Yamada, Neyagawa; Kanji Kubo, Katano; Yasuo Nishitani, Moriguchi, all of Japan

[73] Assignee: Matsushita Electric Industrial Co., Ltd., Osaka, Japan

[21] Appl. No.: 491,771

[22] Filed: May 5, 1983

[30] Foreign Application Priority Data

May 7, 1982 [JP] Japan .................................. 57-76817

[51] Int. Cl.$^4$ ..................... G11B 15/467; H04N 5/783
[52] U.S. Cl. .................................. 360/10.2; 360/10.3; 360/77
[58] Field of Search ..................... 360/10.1, 10.2, 10.3, 360/77, DIG. 1, 70, 73, 74.4, 74.1, 75; 358/312

[56] References Cited

U.S. PATENT DOCUMENTS

| | | | |
|---|---|---|---|
| 3,557,320 | 2/1971 | Hopf | 360/10.2 |
| 3,943,562 | 3/1976 | Opelt | 360/10.3 |
| 4,071,856 | 1/1978 | Kihara et al. | 360/77 X |
| 4,189,758 | 2/1980 | Morio et al. | 360/10.2 X |
| 4,190,869 | 2/1980 | Ota | 360/10.2 |
| 4,276,571 | 6/1981 | Sakamoto | 360/10.2 |
| 4,403,260 | 9/1983 | Kawamura et al. | 360/10.3 |
| 4,414,586 | 11/1983 | Hirota et al. | 360/75 X |
| 4,439,799 | 3/1984 | Haubrich et al. | 360/10.2 X |

Primary Examiner—Raymond F. Cardillo
Assistant Examiner—Robert A. Weinhardt
Attorney, Agent, or Firm—Stevens, Davis, Miller & Mosher

[57] ABSTRACT

A magnetic recording and reproduction system of the helical scan type is disclosed. During the recording process, pilot signals for reproduction tracking control are sequentially recorded by the rotary magnetic head in recording tracks in proximity to each other in superimposed relation with the television signal to be recorded. During the normal reproduction process, from the level difference between the crosstalk signals of the pilot signals reproduced from the recording tracks adjacent to the recording track to be reproduced, a tracking error is detected to control the relative positions of the recording track and the reproduction scanning traces of the reproduction magnetic head. During the reproduction process at a speed different from that for recording, on the other hand, a pulse signal is produced at a time point when the crosstalk levels of the pilot signals reproduced from the tracks adjacent to the recording track to be reproduced coincide with each other. This pulse signal is used to maintain a predetermined positional relation between the recording track and the reproduction scanning traces of the reproduction magnetic head thereby to produce a superior reproduced image.

8 Claims, 14 Drawing Figures

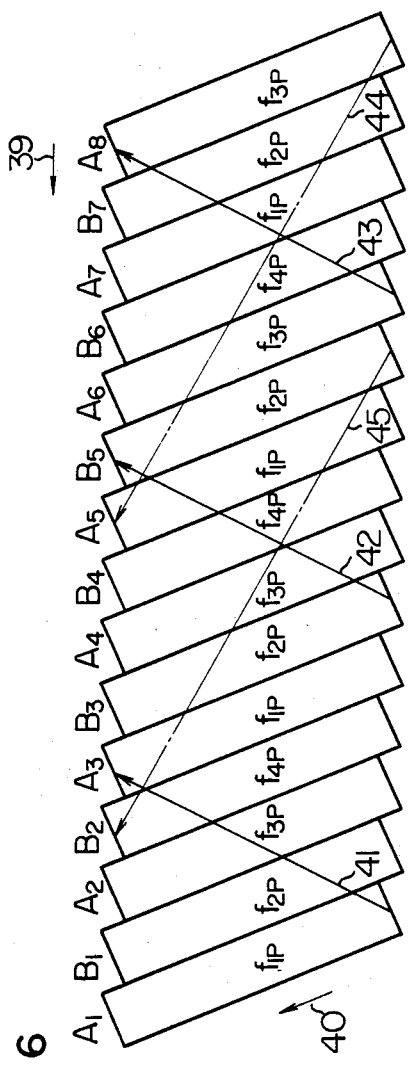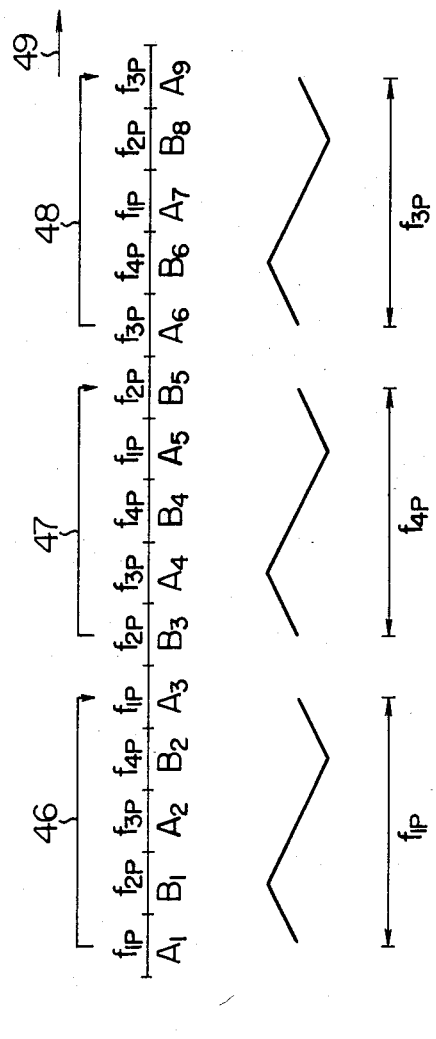
FIG. 6
FIG. 8

(f) $f_{1P}$ (g) $f_{2P}$ (h) $f_{3P}$ (i) $f_{4P}$

HELICAL SCAN MAGNETIC RECORDING AND REPRODUCTION SYSTEM WITH HEAD POSITION CONTROL

The present invention relates to a magnetic recording and reproduction system of the helical scanning type, or more in particular to a magnetic recording and reproduction system in which a superior reproduction picture is obtained by controlling the relative positions of a recording track and the reproduction traces of the reproduction magnetic head in a predetermined manner.

In a magnetic recording and reproduction system of the double-headed helical scan type, special reproductions find application including the fine slow playback in which the magnetic tape is intermittently driven at the time of reproduction to perform a still reproduction with the deteriorated portion of the reproduction output positioned at the vertical blanking portion, thus producing a reproduction image of high S/N ratio, or forward rapid feed (hereinafter referred to as the "cue") or the reverse rapid feed (hereinafter referred to as the "review") with the noise on the image maintained stationary all the time in the video tape recorder of the VHS system.

First, the fine slow reproduction will be described with reference to FIG. 1.

Assume that the capstan motor for feeding the tape is accelerated during the period from $t_0$ to $t_1$ and that the motor enters the steady state (slower than the normal speed) at the end $t_1$ of the acceleration.

After that, during the recording time, a control signal (hereinafter sometimes referred to as the CTL signal) written for each frame in predetermined time relation with the recording track position at the end of the tape is detected and the tape is fed at normal speed from the time point $t_c$ when the control signal is detected to the time point $t_2$. Then the capstan motor is braked from time $t_2$ to time point $t_3$ to enter the still state. After repeating the still state a plurality of times according to the slow motion ratio, the above-mentioned operation is repeated for fine slow reproduction. In the process, the amount of tape feed $Q_0$ to $Q_3$ represents one frame, and the amount of tape feed $Q_C$ before detection of the CTL signal is controlled to the center between $Q_0$ and $Q_3$.

The operating principle of the conventional fine slow reproduction in the tracking system using the CTL signal was explained above. As seen from this explanation, the CTL provides a reference signal necessary for controlling the stop position of the still image. In FIG. 1, reference numeral 70 designates a magnetic tape, numeral 71 a recording track, numeral 72 a CTL signal and a dot A a still position.

Now, the operating principle of the cue and review processes will be described.

Assume that the tape is fed at a speed which is N times higher than the recording tape speed. The period of the reproduction CTL signal is N times larger than the one for normal reproduction, and therefore the phase of the tape feed is controlled in such a way that the signal obtained by dividing the CTL signal to 1/N coincides in phase with a signal synchronous with the rotational phase of the rotary head. By this phase control, it is possible to maintain the noise bar stationary on the image.

The conventional means mentioned above, however, cannot be used in a new format of VTR system in which the tracking is based on the signal reproduced by the video head and which lacks the conventional CTL track along the longitudinal direction of the tape.

Accordingly, it is an object of the present invention to provide a magnetic recording and reproduction system of the helical scan type in which the tracking is effected on the basis of a pilot signal reproduced by the video head and in which the relative positions of the recording track to be reproduced and the reproduction scanning traces of the magnetic head are detected at the time of a special reproduction such as fine slow, cue or review.

Another object of the present invention is to provide a pseudo CTL signal generator circuit suitable for producing a pulse signal representing the positional relation between the recording track to be reproduced and the reproduction scanning traces.

According to the magnetic recording and reproduction system of the helical scan type of the present invention, during the recording period, four pilot signals $f_{1P}$, $f_{2P}$, $f_{3P}$ and $f_{4P}$ of different frequencies are superimposed on the television signal to be recorded by being switched thereby to sequentially record the same by the rotary head as a rcording track in proximity to each other on the magnetic tape, while during the reproduction period, a tracking error signal is produced by use of an operational circuit for producing an error signal between a reference signal and a pilot signal reproduced from the main scanning track and each adjacent track, a frequency separator circuit for separating a signal of first and second frequencies from the output signal of the operational circuit, and a level comparator circuit for comparing the output levels of the frequency separator circuit with each other, so that the relative positions of the recording track and the reproduction scanning traces of the reproduction magnetic head are controlled. In the case of reproduction at a speed different from the recording tape speed, on the other hand, a pulse signal is produced at a time point when the levels of the crosstalks of the pilot signals reproduced from adjacent tracks coincide with each other as against the recording track to be reproduced, and this pulse signal is used for tracking control.

The present invention will be apparent from the following detailed description taken in conjunction with the accompanying drawings, in which.

Figure 4:
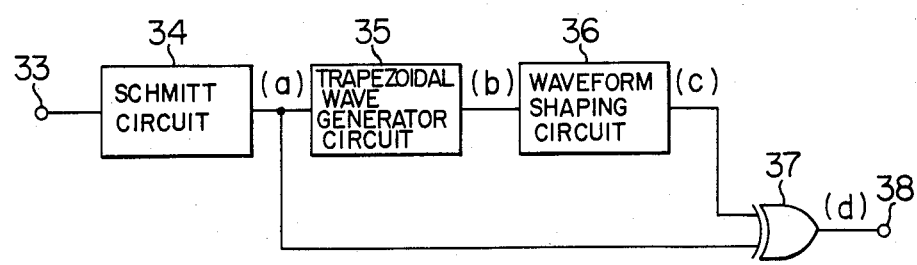
FIG. 4 is a block diagram showing an embodiment of the pseudo CTL signal generator circuit.
Figure 5:
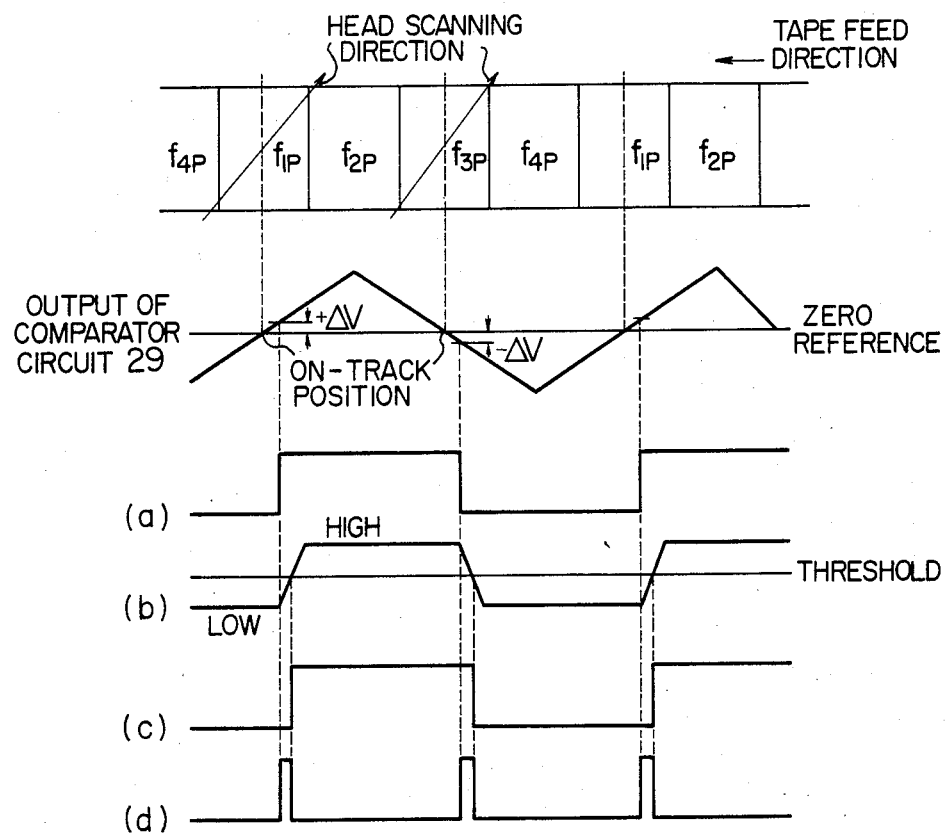
Figure 7:
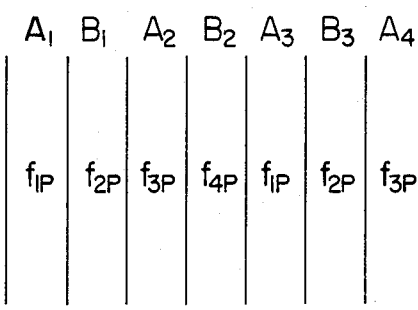
Figure 7:
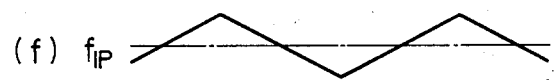
Figure 7:
Figure 7:
Figure 7:
Figure 9:
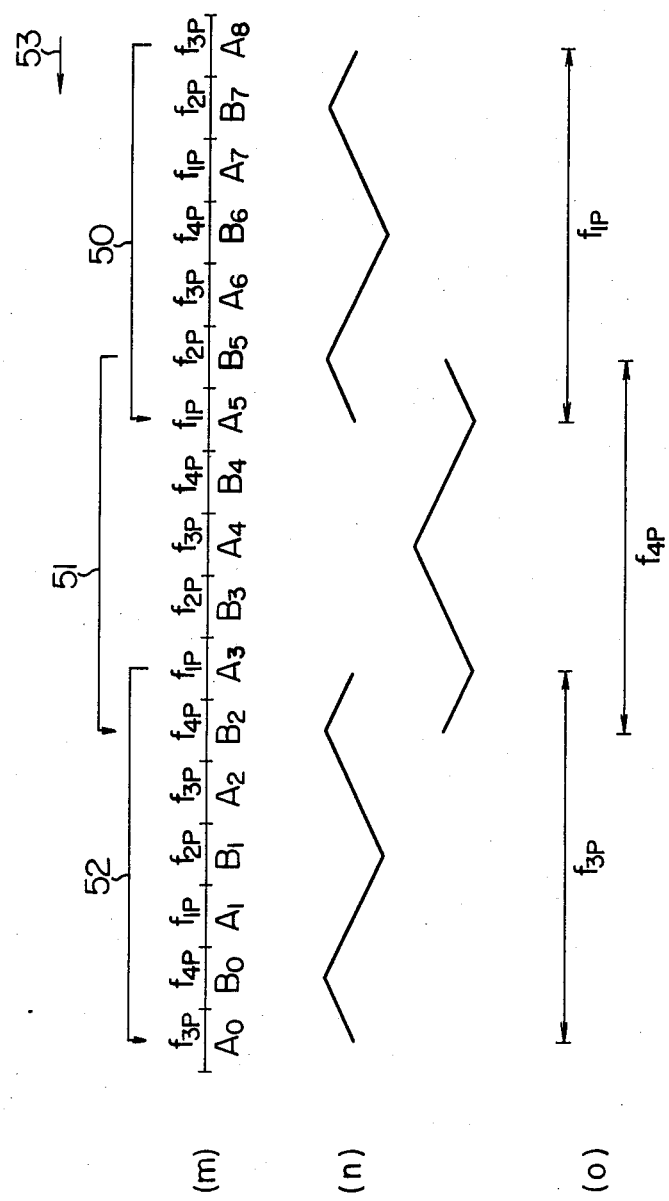
Figure 10:
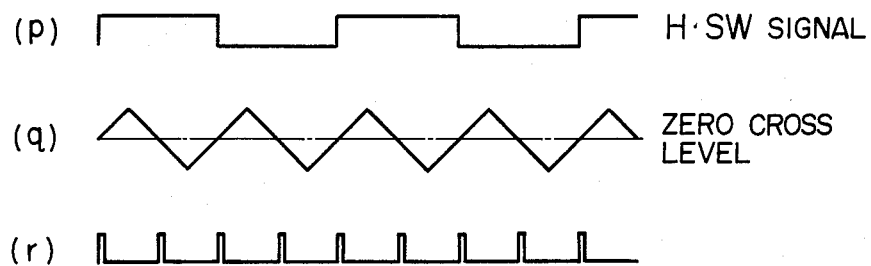
Figure 11:
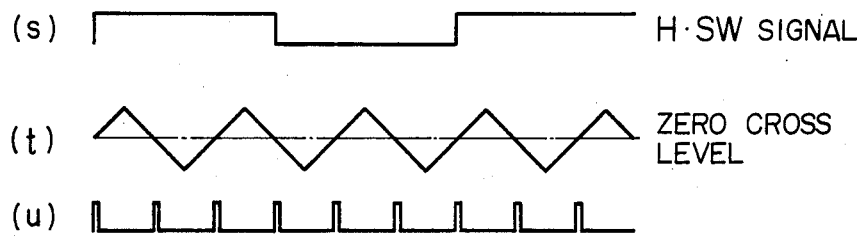
Figure 12:
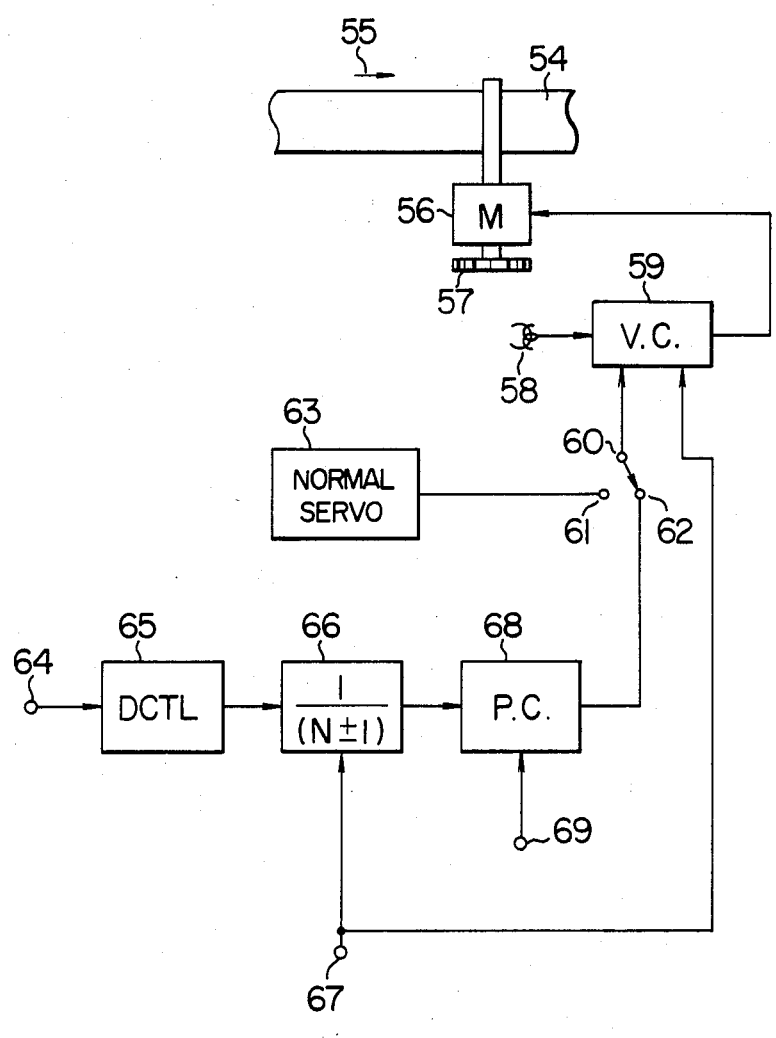
Figure 13:
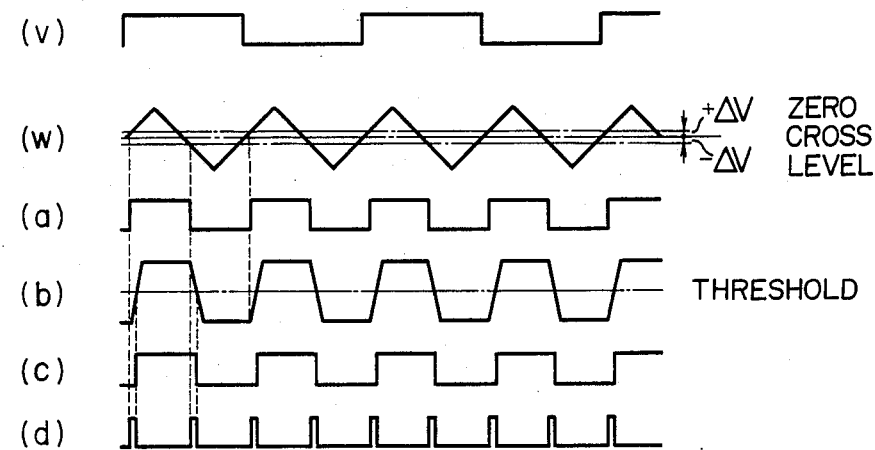
Figure 14:
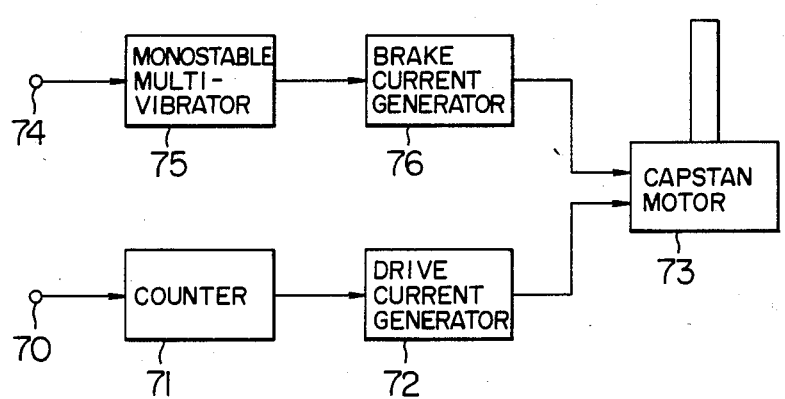

FIG. 5, consisting of (a)-(d), is a diagram showing operating waveforms of each block of FIG. 4 produced during the fine slow reproduction;

FIG. 6 is a diagram showing the head scanning traces during the cue and review processes as well as the recording magnetization traces;

FIG. 7 shows waveforms of the tracking error signal produced when the reference signal supplied to a balanced modulator circuit 22 is fixed;

FIGS. 8 and 9 are diagrams for explaining the tracking signal waveforms obtained at the time of cue and review operations respectively;

FIGS. 10 and 11 are diagrams showing the tracking signal and the pseudo CTL signal obtained at the time of the cue and review operations respectively;

FIG. 12 is a diagram showing a specific embodiment of the present invention;

FIG. 13 shows operation waveforms produced from various parts of the circuit shown in the block diagram of FIG. 4 for review operation; and FIG. 14 is a block diagram showing the essential parts of an embodiment of the present invention.

Prior to the detailed explanation of the present invention, a configuration of an ordinary tracking system using no CTL signal will be described with reference to FIG. 2.

During the recording process, a video signal to be recorded which is supplied from a terminal 1 is applied to a luminance signal processing circuit 2 and a color signal processing circuit 3, the outputs of which are mixed with each other after appropriate processing.

The video signal to be recorded is further applied to a horizontal sync. separator circuit 5 through a switch 4 thereby to produce a horizontal sync. signal of a frequency $f_H$ alone by being separated. The frequency $f_H$ of this horizontal sync. signal is applied to a PLL 6 to be converted into a frequency $f_H$ n times higher. This n-fold $f_H$ is applied to frequency divider circuits 7, 8, 9 and 10 to be divided into $1/n_1$, $1/n_2$, $1/n_3$ and $1/n_4$ respectively, thus producing output signals $f_{1P}$, $f_{2P}$, $f_{3P}$ and $f_{4P}$ of frequencies $f_1$, $f_2$, $f_3$ and $f_4$ respectively. These output signals $f_{1P}$, $f_{2P}$, $F_{3P}$ and $f_{4P}$ are applied to a switch 13 which performs the switching operation for each field in response to an output of a four-field selector 12 through which a head switching pulse (H-SW) synchronous with the rotational phase of the rotary head is applied from the terminal 11 to the switch 13.

In the output of the switch 13, the signals $f_{1P}$, $f_{2P}$, $f_{3P}$ and $f_{4P}$ are switched in that order repeatedly. The pilot signal produced from the switch 13 is applied through a low-pass filter 14 and is superimposed on the video signal to be recorded, which has been subjected to the mixing process at the signal processing circuits 2 and 3. The resulting signal, after being amplified at a recording amplifier 15, is applied through a switch 16 to a video head 17 to be recorded on the recording medium.

During the reproduction processes, on the other hand, a reproduction video signal reproduced from the video head 17 is applied through the switch 16 to a reproduction head amplifier 18, and after being thus amplified, is applied to a luminance signal processing circuit 19 on the one hand and to a color signal processing circuit 20 on the other hand. The signals produced from these circuits are mixed with each other and the resulting mixed signal is applied to a monitor as a reproduction video signal. This reproduction video signal is applied to the switch 4, and through the horizontal sync. signal separator circuit 5, is produced as a reproduction horizontal sync. signal of frequency $f_H$.

The output of the head amplifier 18, on the other hand, is applied to the low-pass filter 21 for picking up the pilot signal recorded, so that for the period of four fields, reproduction pilot signals different for each field and the pilot signal produced from the output of the low-pass filter 14 are applied to a balanced modulator 22, the output of which is in turn applied to bandpass filters 23 and 24. The outputs of the bandpass filters 23 and 24 are smoothed at detectors 25, 26 and the low-pass filters 27, 28, and then applied to a comparator circuit 29. The output of the comparator circuit 29 is applied through an inverter circuit 30 adapted to be inverted analogically, to one of the input terminals of a switch 31 adapted to be switched in response to a H.SW signal applied thereto from the terminal 11. The other input terminal of the switch 31 is supplied with an output of the comparator circuit 29. These two types of signals are picked up alternately from the output of the switch 31 for each field. The output of the switch 31 is applied to a low pass filter 32 to produce a smoothed tracking error signal, which is applied to a capstan servo system as a phase error signal thereby to control the tape feed speed for the purpose of control of the tracking control for reproduction.

Now, the operating principle will be specifically explained with reference to FIG. 3 and the table below.

TABLE

| A head | | B head | |
|---|---|---|---|
| leftward | rightward | leftward | rightward |
| 3 $f_H$ | 1 $f_H$ | 1 $f_H$ | 3 $f_H$ |

Figure 3:
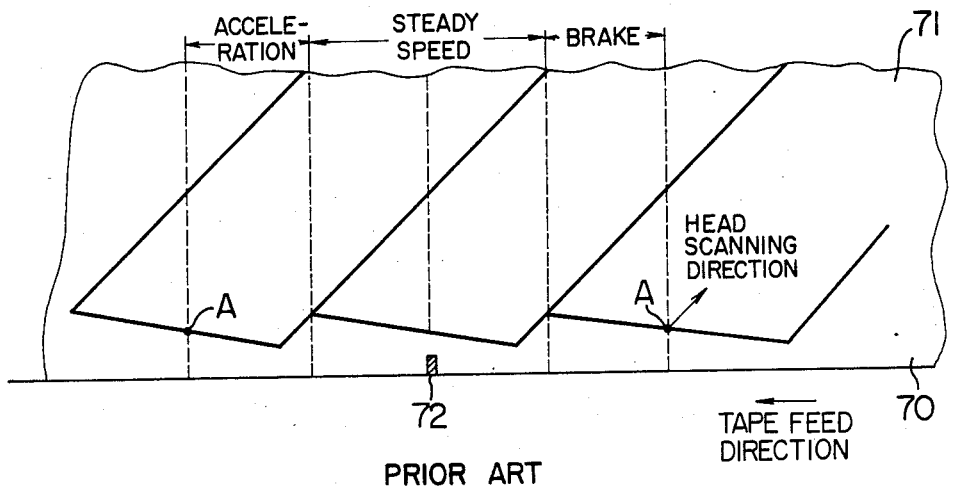
FIG. 3 shows a tape pattern for the tracking system shown in FIG. 2.
Figure 3:
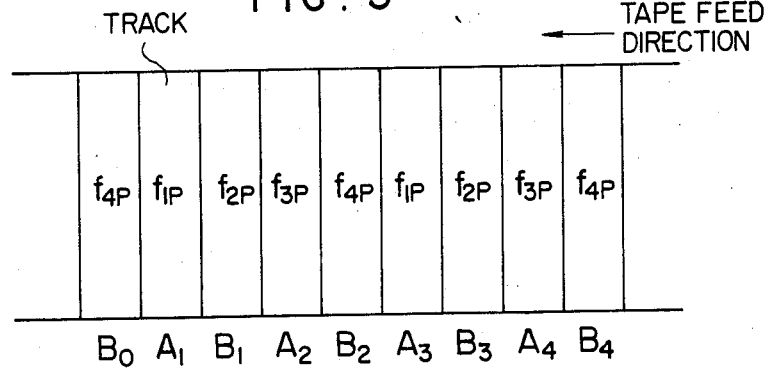

If this construction is realized at the time of recording, each of the pilot signals $f_{1P}$, $f_{2P}$, $f_{3P}$, $f_{4P}$, $f_{1P}$ and so on is recorded in that order on the tape repeatedly for each track as shown in FIG. 3.

Assume, for instance, that the output frequency of the PLL 6 and the frequency dividing ratios ($n_1$ to $n_4$) of the frequency-dividing circuits 7, 8, 9 and 10 are determined in such a manner that the frequencies of the recording pilot signals $f_{1P}$, $f_{2P}$, $f_{3P}$ and $f_{4P}$ include $6.5 \times f_H$ for $f_1$, $7.5 \times f_H$ for $f_2$, $10.5 \times f_H$ for $f_3$, and $9.5 \times f_H$ for $f_4$. As shown in FIG. 3, when the head is scanning the tracks $A_1$, $A_2$, $A_3$, $A_4$ and so on for reproduction, the frequency difference in the left direction on the page is $3 \times f_H$ and the one in the right direction on the page is $1 \times f_H$. Also, when the head is scanning the tracks $B_0$, $B_1$, $B_2$, $B_3$, $B_4$ and so on, the frequency difference involved in the left direction on the page is $1 \times f_H$ and that in the right direction on the page is $3 \times f_H$.

As explained above, if the pilot signals $f_{1P}$, $f_{2P}$, $f_{3P}$ and $f_{4P}$ are recorded in a predetermined sequence, only the crosstalk signals of $1 \times f_H$ and $3 \times f_H$ can be picked up from the output of the balanced modulator 22 by performing the balanced modulation through the balanced modulator 22 of the reproduction pilot signals produced from the low pass filter 21 and the reference pilot signal produced from the low pass filter 14 at the time of reproduction.

When the head is scanning the tracks $A_1$, $A_2$, $A_3$, $A_4$ and so on for reproduction, the level of the crosstalk signal becomes $1 \times f_H < 3 \times f_H$ if displaced leftward from the on-track position (track center) on the page, while the level changes so that $1 \times f_H > 3 \times f_H$ if displacement occurs rightward on the page.

Assume, on the other hand, the head is scanning the tracks $B_0$, $B_1$, $B_2$, $B_3$, $B_4$ and so on for reproduction. If displacement occurs leftward on the page from the on-track position, the crosstalk signal level becomes $1 \times f_H > 3 \times f_H$, while if the head is displaced in right direction, the crosstalk level becomes $1 \times f_H < 3 \times f_H$.

These crosstalk signals are picked up by the bandpass filters 23 and 24 set to the frequencies of $1 \times f_H$ and $3 \times f_H$ respectively, and are applied through the detectors 25, 26 and the low-pass filters 27, 28 respectively, where the signals are smoothed in DC fashion. These two output signals are then compared with each other at the comparator 29 thereby to produce a signal corresponding to the difference therebetween.

In other words, the comparator 29 produces a signal representing a track displacement.

The tape feed rate is thus controlled in such a manner that the output signals obtained from the low-pass filters 27 and 28 are equal in level to each other.

As seen from above, the relation between the direction of track displacement on the page by the head and the level difference of the crosstalk signals obtained when the head is scanning the tracks $A_1$, $A_2$, $A_3$, $A_4$ and so on for reproduction is reverse to that obtained when the head is scanning the tracks $B_0$, $B_1$, $B_2$, $B_3$, $B_4$ and so on for reproduction.

As a result, it is necessary to reverse the polarities of the tracking error signals produced from the heads A and B from each other. For this reason, one of the input terminals of the switch 31 to be switched in accordance with the H.SW signal is supplied with the output of the comparator 29 through the reversing citcuit 30 for analogically inverting the output of the comparator 29, while the other terminal of the switch 31 is impressed with the output of the comparator circuit 29.

Figure 2:
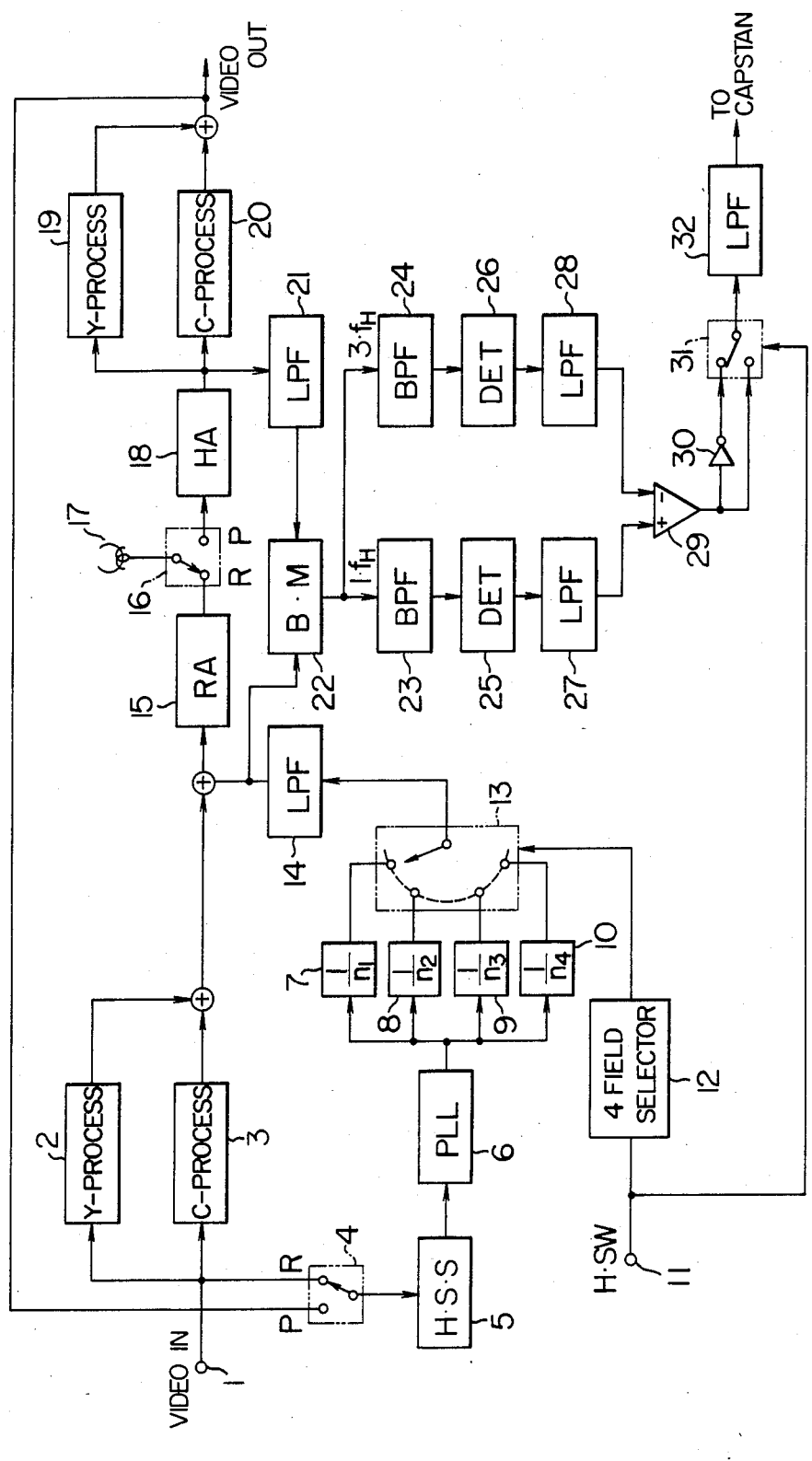
FIG. 2 is a configuration diagram showing a tracking system using four types of pilot signal instead of the conventional CTL signal.

The explanation was made above of the operating principle of the construction of the tracking system operated without any control signal as shown in FIG. 2.

According to the present invention, there is provided a method in which, in the configuration of the tracking system as shown in FIG. 2, a reference signal corresponding to the conventional CTL signal is produced during a special reproduction while at the same time effecting stable tape feed control.

First, the operation for the fine slow reproduction will be described with reference to FIG. 4 showing a block diagram of a pseudo control signal generator circuit according to an embodiment of the present invention and FIG. 5 showing operating waveforms produced at various parts of the circuit.

Explanation will be made of the construction of the embodiment of the CTL signal generator circuit shown FIG. 4. The output of the comparator circuit 29 is applied through the terminal 33 to a Schmitt citcuit 34 providing a hysteresis of $+\Delta V$ and $-\Delta V$ from the center of the signal level set to the zero output reference of the comparator circuit 29. The output of the Schmitt circuit 34 is applied to a trapezoidal wave generator circuit 35 for producing an output having inclined leading and trailing edges.

The output of the trapezoidal wave generator circuit 35 is applied to a waveform shaping circuit 36 having a threshold value for waveform shaping at a point between the low potential and the high potential of the trapezoidal wave output, and the output of the waveform shaping circuit 36 is applied to one input terminal of an exclusive OR circuit 37. The other input terminal of the exclusive OR circuit 37 is supplied with an output of the Schmitt circuit 34.

The exclusive OR circuit 37 is so constructed as to produce a "high" output at the terminal 38 only when the outputs of the waveform shaping circuit 36 and the Schmitt circuit 34 are "high" and "low" or "low" and "high" respectively.

An embodiment of the pseudo control signal generator circuit according to the present invention was explained above. The operating principle of this circuit for the fine slow reproduction mode will specifically be explained with reference to FIGS. 1, 2, 3 and 4 below.

During the recording process, the pilot signals $f_{1P}$, $f_{2P}$, $f_{3P}$, $f_{4P}$, $f_{1P}$ and so forth shown in FIG. 3 are recorded in that order at each field (for each recording track) for the period of four fields. According to the present invention, during the fine slow reproduction process, the four-field switching circuit 12 is stopped while the switch 13 is kept switchable by use of an external signal, so that any one of the signals of different frequencies $f_{1P}$, $f_{2P}$, $f_{3P}$ and $f_{4P}$ may be picked up selectively in continuous manner.

Reference will be made to the case in which the pilot signal of the frequency $f_{1P}$ is picked up.

During the fine slow reproduction, the reproduction pilot signals $f_{1P}$, $f_{2P}$, $f_{3P}$, $f_{4P}$, $f_{1P}$ and so forth arranged in that order for each field on the tape pattern reproduced from the low-pass filter 21 and the continuous signal of the frequency $f_{1P}$ is subjected to the balanced modulation at the balanced modulator 22.

Figure 1:
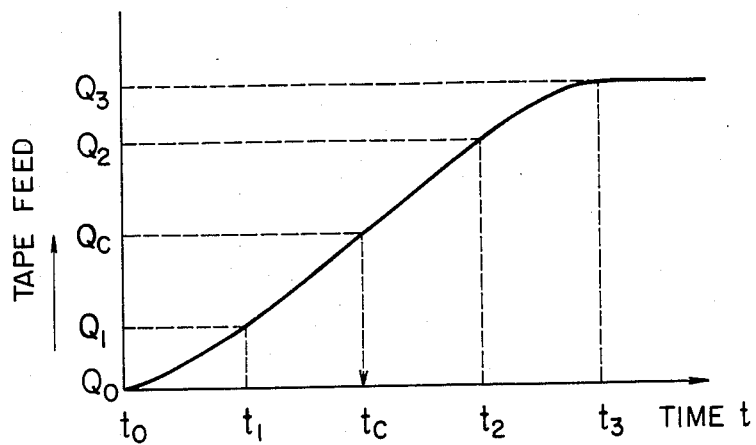
FIG. 1 shows operating waveforms produced during the fine slow reproduction.

If, as explained with reference to FIG. 1, the time $t_0$ of tape acceleration start is located at the track position where the signal $f_{4P}$ is recorded, the tape runs at a predetermined speed (lower than normal speed) on the track containing the frequency $f_{1P}$ while the reproduction head scans the page diagonally toward the upper right. In the process, the output signal of the comparator circuit 29 changes in the manner shown in FIG. 5.

When the output of the comparator circuit 29 is passed through the terminal 33 and is applied to the Schmitt circuit 34, the Schmitt circuit 34 produces an output (a) which rises to the "high" point when the output of the comparator circuit 29 is raised by $+\Delta V$ from the zero output reference level and lowers to the "low" potential at the time point when the output thereof is reduced to $-\Delta V$.

The output (a) of the Schmitt circuit 34 is applied to the trapezoidal wave generator circuit 35 to produce a trapezoidal output (b) with inclined leading and tail edges therefrom. The trapezoidal output (b) is applied to a waveform shaping circuit 36 provided with a threshold level between the "low" and "high" potentials of the trapezoidal waveform output (b) thereby to produce an output signal (c) delayed in phase from the output (a) of the Schmitt circuit 34.

The output (c) of the waveform shaping circuit 34 and the output (a) of the Schmitt circuit 34 are applied to the exclusive OR circuit 37, so that a "high" voltage pulse is produced at the terminal 38 in the form of the output (d) of the exclusive OR circuit 37 only when the potentials of the two input signals are different from each other.

In the event that the input sensitivity $+\Delta V$ and $-\Delta V$ of the Schmitt circuit 34 of the pseudo CTL signal generator circuit shown in FIG. 4 is set to a sufficiently low level, the pulse output (d) obtained from the terminal 38 is located at the on-track position.

This on-track position is always in a predetermined time relation with the CTL signal position recorded at the tape end in the conventional system. Therefore, by using the output (d) obtained from the exclusive OR circuit 37 shown in FIG. 3 in place of the conventional CTL signal, the capstan motor is braked after a predetermined time with reference to the output (d), so that the resulting stoppage at the track position where the signal $f_{2P}$ is recorded permits the still reproduction without any noise as in the conventional systems.

Also when the acceleration is started at the track containing the recorded signal of $f_{2P}$, the tape is fed at predetermined speed (lower than the normal speed) on the tape recorded with the signal $f_{3P}$, so that the playback head scans toward the right upper side of the page. In this case, too, the pulse output (d) is produced at the position representing the on-track position recorded with the signal $f_{3P}$. This pulse output signal (d) is used in place of the prior art CTL signal, and the capstan motor is braked after a predetermined time with the pulse output signal (d) as a reference. In this way, the tape is stopped at the track position recorded with the signal $f_{4P}$, thus making possible the still reproduction free of noise.

Specifically, as shown in FIG. 14, an H.SW signal is applied to a terminal 70, and this H.SW signal is counted at a counter circuit 71, so that a pulse is generated for each predetermined count (which count is different depending on the slow motion ratio).

The pulse thus produced is applied to a motor drive current generator circuit 72 thereby to produce a drive current for a predetermined period for each application of the pulse, which drive current is used to drive the capstan motor 73 thereby to feed the tape. On the other hand, the output (d) produced from the terminal 38 during the feeding of the tape is applied to a terminal 74, and after being delayed for a predetermined period of time by a monostable multivibrator 75, is applied to a brake current generator circuit 76. The brake current generator circuit 75 thus generates a brake current which is used to stop the capstan motor 73. This embodiment is different from the prior art systems in that the signal (FIG. 5(d)) generated by the configuration of FIG. 4 instead of the playback CTL signal is applied to the terminal 74.

The construction and the operating principle of the system according to the present invention are described above. The construction of the present invention may be used in the tracking system without any CTL signal unlike the conventional system, for producing a reference signal corresponding to the CTL signal required for control of the still stop position in fine slow reproduction, thus making stable fine slow reproduction possible.

Explanation will be made now about a method of controlling the tape feed phase for the cue or review operation according to the present invention.

FIG. 6 is a diagram showing the recording magnetization traces and the head scanning traces for cue and review processes. In FIG. 6, $A_1$, $B_1$ and like symbols designate the recording magnetization traces on the magnetic tape, an arror 39 designates the direction of tape feed, and an arrow 40 the direction of scanning of the rotary head. Characters $f_{1P}$ to $f_{4P}$ designate pilot signals used for tracking control. For example, the pilot signal $f_{1P}$ is recorded in the track $A_1$.

In the explanation that follows, the tape speed for cue or review operation is assumed to be five times higher than that for recording unless otherwise specified.

In FIG. 6, arrows 41 to 43 designate the head scanning traces for the cue operation. When the tape is fed at a speed five times higher than the recording tape speed, the rotary head scans from the starting end of the track $A_1$ (the lower end of the page) to the tail end of the track $A_3$. Specifically, the trace designated by the arrow 41 is followed. In the video tape recorder of double-headed helical scan type, the B head is located at the starting end of the track $B_3$ when the A head is positioned at the tail end of the track $A_3$. The B head thus follows the scanning trace shown by the arrow 42.

The head scanning traces for the review operation five times higher in tape speed than the recording operation are as shown by the arrows 44 and 45. This is explained by the same well-known operating principle as that of the cue operation and will not be described again.

Now, the tracking signals produced at the time of cue or review operation will be explained.

FIGS. 7(f) to 7(i) show the recording tracks and the levels of the tracking error signals produced when the reference signals applied to the balanced modulator of FIG. 2 are fixed to $f_{1P}$ to $f_{4P}$ respectively.

Reference characters $A_1$, $B_1$, $A_2$ and so on in FIG. 7 designate the recording tracks. Respective frequencies of the pilot signals are recorded in accordance with the tracks shown in the drawing. The ordinate of FIGS. 7(f) to 7(i) represents the level of the tracking error signal produced from the output of the comparator circuit 29 shown in FIG. 2, and the abscissa represents positions of the recording tracks shown in the same diagram. The waveform shown in FIG. 7 (f) is a tracking error signal produced when the frequency of the reference signal applied to the balanced modulator 22 is fixed to $f_{1P}$. When the head is located at the center along the width of the track $B_1$, for instance, the resonant signal level of $f_H$ is highest, while when the head is positioned at the center along the width of the track $B_2$, the resonant signal level of $3f_H$ is maximum. As a result, when the reference signal is fixed to $f_{1P}$, the tracking error signal as shown by FIG. 7(f) is produced at the output of the comparator circuit 29 of FIG. 2. In similar fashion, it is apparent that the tracking error signals as shown in FIGS. 7(g), 7(h) and 7(i) are obtained when the reference signal is fixed to $f_{2P}$, $f_{3P}$ and $f_{4P}$ respectively.

The sequence of supply of the reference signals may be reversed by the four-field selector 12.

Specifically, the four-field selector 12 is so constructed that the switch 13 is operated in accordance with a combination of the H.SW signal and the "high" or "low" state of the signal obtained by dividing the H.SW signal by one half. The table below shows the relation between the pilot signals selected by such a combination.

TABLE

|  | $f_{1P}$ | $f_{2P}$ | $f_{3P}$ | $f_{4P}$ |
|---|---|---|---|---|
| H · SW | 1 | 0 | 1 | 0 |
| ½H · SW | 1 | 1 | 0 | 0 |

Assume that the H.SW signal is reversed while maintaining the above-mentioned relation. If the sequence of the switching operation before the reversal is $f_{1P}$ to $f_{2P}$ to $f_{3P}$ to $f_{4P}$, then the sequence is reversed so that signals $f_{2P}$, $f_{1P}$, $f_{4P}$ and $f_{3P}$ are switched in that order. In this way, the sequence of application of the reference signals is reversed.

FIG. 8(j) shows the recording tracks $A_1$, $B_1$, and so on and the pilot signals recorded in these tracks. The arrows 46 to 49 correspond to the scanning traces 41 to 43 shown in FIG. 6. Specifically, the rotary head scans the tracks $A_1$ to $A_3$ during one field period, followed by the scanning of the tracks $B_3$ to $B_5$. FIG. 8 (k) shows a tracking error signal, and FIG. 8(l) the frequency of the reference signals applied to the balanced modulator circuit 22. During the first scanning step indicated by the arrow 46, the reference signal of $f_{1P}$ is involved. The tracking error signal produced during this process is represented by the tracks $A_1$ to $A_3$ of the signal of FIG.

7(f). The second scanning step shown by the arrow 47, on the other hand, is associated with the reference signal of $f_{4P}$. In this case, the tracking error signal represented by the tracks $B_1$ to $B_3$ of the signal of FIG. 7(i) is produced. The tracking error signals for the other scanning steps are obtained in similar manner. The arrow 49 indicates the direction of the progress of time for the cue operation.

Now, the tracking error signal for the review operation will be explained. FIG. 9(m) shows the recording tracks and the pilot signal frequencies, FIG. 9(n) the tracking error signals, and FIG. 9(o) the reference signals. Arrows 50, 51 and 52 indicate the head scanning in a field period and correspond to the scanning traces 44, 45 and the like in FIG. 6. In FIG. 9, time passes in the direction shown by the arrow 53. The reference signal $f_1$ is for the scanning period shown by the arrow 50, during which the tracking error signals $A_4$ to $A_1$ shown in FIG. 7(f) are produced. On the other hand, the reference signal $f_4$ is for the scanning period indicated by the arrow 51, during which the tracking error signal is associated with the track $B_3$ to the track preceding to the track $A_1$ (the track on the left side of the track $A_1$ on the page, where $f_4$ is recorded, not shown) of the signals shown in FIG. 7(i). In similar manner, the tracking error signal, if any, is produced for each scanning.

FIGS. 10 and 11 show the tracking error signals explained with reference to FIGS. 8 and 9, plotted in a manner corresponding to the head switching signals (H.SW signals). FIGS. 10(p) and 11(s) show the H.SW signals. FIG. 10(q) shows the signal of FIG. 8(k) plotted in continuous time series. In FIG. 8, the tail end of the range indicated by the arrow 46, namely, the time of the track $A_3$ coincides with the starting end of the range indicated by the arrow 47, namely, the time of the track $B_3$. Thus, if the signal of FIG. 8(k) is plotted in continuous time series, the waveform of FIG. 10(q) is obtained. The signal shown in FIG. 11(t) represents the signal of FIG. 9(n) plotted in continuous time series in a similar manner. FIGS. 10(r) and 11(u) show pulse signals generated by detecting the zero crossing level of the signals of FIG. 10(q) and 11(t) at the pseudo CTL signal generator circuit. As apparent from (r) and (q), four pulses are obtained for one frame during the cue operation five times higher in tape speed, and six pulses for one frame during the review period. Generally, it is known that $(N-1)$ pulses are obtained during the cue operation N times higher in tape speed and $(N+1)$ pulses during the review process, for one frame, by this method. It is therefore possible to maintain a predetermined phase relation between the H.SW signal and the signal (q) or (t) by controlling the tape feed phase in such a manner as to hold a predetermined phase relation between the H.SW signal and the signal obtained by frequency-dividing the signal (r) to $1/(N-1)$ during the cue process N times higher in tape speed, or between the H.SW signal and the signal obtained by frequency-dividing the signal (u) to $1/(N+1)$ during the review operation. This indicates that the noise position on the picture can be fixed thereon. This is because if the head A scans the period of the arrow 46 in FIG. 8, a video signal is reproduced by the scanning of the track A, while it is impossible to reproduce the video signal by scanning the track B, thus causing noise. This noise position corresponds to the maximum level or minimum level of the signal (k). If the phases of the triangular wave signal of FIG. 10(q) and the H.SW signal are maintained in a predetermined relation, therefore, the noise position on the picture can be fixed.

Although the foregoing description is based on the assumption that the head scanning is started from the center of a given track, the scanning by the head may be started at any point on a given track to obtain the continuous triangular wave signals shown in FIGS. 10(q) and 11(t).

Also, the scanning period designated in FIG. 8 by, say, 46 is not necessarily associated with the reference signal $f_1$, to the extent that the reference signals supplied to the balanced modulator circuit during the cue or review operation are in a sequence reverse to the pilot signals recorded.

FIG. 12 shows a block diagram of a specific embodiment of the present invention. In FIG. 12, numeral 54 designates a magnetic tape, and numeral 56 a capstan motor. The magnetic tape is fed by being wound on a rotary cylinder and various tape guide posts not shown as in an ordinary video tape recorder. Arrow 55 indicates the direction of feeding of the magnetic tape. Numeral 57 shows a frequency generator secured to the capstan motor 56, and numeral 58 a detection head for detecting a signal of a frequency corresponding to the rotational speed of the capstan motor from the frequency generator 57. Numeral 59 designates a well-known speed control circuit using the frequency generator signal. The phase of the magnetic tape feed is controlled by supplying a phase error signal from a switch 60 to the speed control circuit 59.

Numeral 63 designates a phase control circuit for normal recording and reproduction. During the recording process, the circuit 63 produces a signal obtained by frequency-dividing the signal of the capstan frequency generator 57 to a field period and a signal corresponding to the phase error with the H.SW signal. During the normal reproduction, on the other hand, the circuit 63 produces the tracking error signal explained above, that is, the signal produced from the output of the low-pass filter 32 of FIG. 2.

The switch 60 is connected to a terminal 61 for normal recording or reproduction, and to a terminal 62 for cue or review operation.

Now, explanation will be made about a circuit for generating a phase error signal for the cue or review process.

The terminal 64 shown in FIG. 12 is supplied with an output signal of the comparator circuit 29 shown in FIG. 2. In the process, the reference signals are supplied to the balanced modulator circuit 22 in FIG. 2 in a sequence reverse to that for recording. Numeral 65 designates a pseudo CTL signal similar to the one shown in FIG. 3 for producing a pseudo CTL signal shown in FIGS. 10(r) and 11(u).

Numeral 66 designates a frequency-dividing circuit for frequency-dividing the pseudo CTL signal to $1/(N-1)$ during the cue operation N times higher in tape speed and to $1/(N+1)$ during the review process. The control signal for cue or review operation is applied from the terminal 67. The control signal supplied from the terminal 67 is also applied to the speed control circuit 59, whereby the speed control circuit 59 operates to attain the tape speed about N times higher than for recording during the process requiring such a higher speed. Numeral 68 designates a phase comparator circuit for comparing the phase of the pulse signal frequency-divided to a field period at the frequency-divider circuit 66 with that of the H.SW signal supplied from the terminal 69 or a signal in phase with the H.SW signal, and produces a phase error signal corresponding to the phase difference between the two signals. The phase error signal is applied through the switch 60 to the speed control circuit 59 thereby to control the phase of tape feed.

Now, the operation of the pseudo CTL signal generator circuit designated by 15 in FIG. 4 will be explained.

FIGS. 13(a) to 13(d) show waveforms produced at various parts of the circuit of FIG. 4. The signals of FIGS. 13(v) and 13(w) correspond to the signals of FIGS. 10(p) and 10(q). FIG. 13(v) shows the H.SW signal and 13(w) the tracking error signal for the cue operation. The pseudo CTL signal generator circuit of FIG. 4 is supplied with the signal of FIG. 13(w).

Upon application of this signal to the Schmitt circuit 34, the Schmitt circuit 34 produces an output (a) which rises to "high" potential at the level of $+\Delta V$ from the zero reference level of the signal (w) of FIG. 13, and drops to "low" potential at the level of $-\Delta V$ of the same signal.

The output (a) of the Schmitt circuit 34 is applied to a trapezoidal wave signal generator 35 to produce a trapezoidal output (b) having inclined leading and tail edges. The trapezoidal output (b) is applied to a waveform shaping circuit 36 with a threshold value between the "low" and "high" potentials of the trapezoidal output (b) thereby to produce an output signal (c) delayed in phase from the output (a) of the Schmitt circuit 34.

Further, the output (c) of the waveform shaping circuit 36 and the output (a) of the Schmitt circuit 34 are applied to an exclusive OR circuit 37 respectively, so that only when the potentials of the two signals are different from each other, an output (d), namely a pulse output of "high" state is produced at the terminal 33 of the exclusive OR circuit 37. This pulse output (d) provides a pseudo CTL signal for the cue or review operation.

It will be understood from the foregoing description that according to the present invention, there is provided a tracking control system without using any CTL signal, in which the tracking error signals obtained are processed as explained above to produce pseudo CTL signals at equal intervals, by use of which the phase of tape feed for cue or review operation is controlled.

What is claimed is:

1. A helical scan magnetic recording and reproduction system comprising:
   means for sequentially recording with a rotary head during a recording period four pilot signals, each having a different frequency, on adjacent recording tracks of a magnetic tape moving at a first tape speed, said sequentially recording means including means for sequentially switching the pilot signals at every one field period and superimposing the same on a television signal to be recorded,
   means for providing, during a reproduction period, a difference signal between a reference pilot signal and cross talk pilot signals reproduced from a main scanning track of a plurality of recorded tracks on said tape and each track adjacent thereto;
   a frequency separator circuit for separating a signal of first and second frequencies from the difference signal and providing a tracking error signal;
   means responsive to said tracking error signal for controlling a relative position of a recording track to a reproduction scanning trace of said rotary head; and
   a pulse signal producing circuit responsive to the output of said separator circuit which, during a reproduction period having a different tape feed speed from said first tape speed, produces a pulse signal when the level of said tracking error signal is identical with a predetermined reference potential, said controlling means being responsive to said pulse signal to control synchronization of the phase of a recorded track with that of said reproduction scanning trace.

2. A helical scan magnetic recording and reproducing system comprising:
   means operative during a recording period for sequentially recording with a rotary head four pilot signals of different frequencies, one for each field of a television signal, in superimposed relation with said television signal on a magnetic tape travelling at a first speed, such that the television signal of each field forms one recording track,
   means operative during a reproduction period when the magnetic tape travels at said first tape speed, for producing first and second frequency signals representing the frequency difference between reference signals and the cross talk pilot signals reproduced from the adjacent recording tracks on both sides of a main reproduced recording track,
   means for controlling the relative positions of the recording track and the reproduction scanning traces of the rotary head by a tracking error signal corresponding to the level difference between said first and second frequency signals,
   means operative during a reproduction period when the magnetic tape travels at a speed different from that for recording, for generating a pulse signal at the time point when the levels of said first and second frequency signals coincide with each other, said pulse signal being used as a signal indicating that said rotary head has reproduced a predetermined position of the recording track pattern on the magnetic tape, and being used by said controlling means for controlling the relative positions of the reproduction scanning traces of said rotary head and the recording track; and
   means for setting one of said four pilot signals as said reference signals, said controlling means being operative to stop the feed of the magnetic tape in response to the generation of said pulse signal.

3. A magnetic recording and reproducing system according to claim 2 further comprising means operative during the reproduction period when the tape is fed in the same direction as at the time of recording at a speed N times higher than for recording, for supplying the four pilot signals as reference signals in a sequence reverse to that for recording thereby to produce a pulse signal.

4. A magnetic recording and reproducing system according to claim 2, further comprising means operative during the reproduction period when the magnetic tape is fed in the direction opposite to that for recording at a speed N times higher than for recording to produce a reproduced image, for supplying the four pilot signals as reference signals in a sequence reverse to that for recording thereby to produce a pulse signal.

5. A helical scan magnetic recording and reproducing system comprising:
   means operative during a recording period for sequentially recording with a rotary head four pilot signals of different frequencies, one for each field of a television signal, in superimposed relation with said television signal on a magnetic tape travelling at a first speed, such that the television signal of each field forms one recording track, means operative during a reproduction period when the magnetic tape travels at said first tape speed, for producing first and second frequency signals representing the frequency difference between reference signals and the cross talk pilot signals reproduced from the adjacent recording tracks on both sides of a main reproduced recording track, means for controlling the relative positions of the recording track and the reproduction scanning traces of the rotary head by a tracking error signal corresponding to the level difference between said first and second frequency signals, means operative during a reproduction period when the magnetic tape travels at a speed different from that for recording, for generating a pulse signal at the time point when the levels of said first and second frequency signals coincide with each other, said pulse signal being used as a signal indicating that said rotary head has reproduced a predetermined position of the recording track pattern on the magnetic tape, and being used by said controlling means for controlling the relative positions of the reproduction scanning traces of said rotary head and the recording track;

said means for generating a pulse signal comprising a Schmitt circuit, a trapezoidal wave generator circuit supplied with an output of said Schmitt circuit, a waveform shaping circuit supplied with an output of said trapezoidal wave generator circuit, and an exclusive OR circuit supplied with an output of said waveform shaping circuit and an output of said Schmitt circuit, said Schmitt circuit being supplied with said tracking error signal so that the tracking control is effective by use of a pulse produced from said exclusive OR circuit.

6. A helical scan magnetic recording and reproducing system comprising:

means operative during a recording period for sequentially recording with a rotary head four pilot signals of different frequencies, one for each field of a television signal, in superimposed relation with said television signal on a magnetic tape travelling at a first speed, such that the television signal of each field forms one recording track, means operative during a reproduction period when the magnetic tape travels at said first tape speed, for producing first and second frequency signals representing the frequency difference between reference signals and the cross talk pilot signals reproduced from the adjacent recording tracks on both sides of a main reproduced recording track, means for controlling the relative positions of the recording track and the reproduction scanning traces of the rotary head by a tracking error signal corresponding to the level difference between said first and second frequency signals, means operative during a reproduction period when the magnetic tape travels at a speed different from that for recording, for generating a pulse signal at the time point when the levels of said first and second frequency signals coincide with each other, said pulse signal being used as a signal indicating that said rotary head has reproduced a predetermined position of the recording track pattern on the magnetic tape, and being used by said controlling means for controlling the relative positions of the reproduction scanning traces of said rotary head and the recording track;

said means for generating a pulse signal comprising a Schmitt circuit, a trapezoidal wave generator circuit supplied with an output of said Schmitt circuit, a waveform shaping circuit supplied with an output of said trapezoidal wave generator circuit, and an exclusive OR circuit supplied with an output of said waveform shaping circuit and an output of said Schmitt circuit, said Schmitt circuit being supplied with said tracking error signal so that the tracking control is effective by use of a pulse produced from said exclusive OR circuit, and means operative during the reproduction process when the magnetic tape is fed in forward direction at a speed N times higher than for recording to produce a reproduced image, for supplying the four pilot signals as reference signals in a sequence reverse to that for recording, the output pulse of said means for generating a pulse signal being frequency-divided to $1/(N-1)$, said frequency-divided signal being used by said controlling means for tracking control.

7. A helical scan magnetic recording and reproducing system comprising:

means operative during a recording period for sequentially recording with a rotary head four pilot signals of different frequencies, one for each field of a television signal, in superimposed relation with said speed, such that the television signal of each field forms one recording track, means operative during a reproduction period when the magnetic tape travels at said first tape speed, for producing first and second frequency signals representing the frequency difference between reference signals and the cross talk pilot signals reproduced from the adjacent recording tracks on both sides of a main reproduced recording track, means for controlling the relative positions of the recording track and the reproduction scanning traces of the rotary head by a tracking error signal corresponding to the level difference between said first and second frequency signals, means operative during a reproduction period when the magnetic tape travels at a speed different from that for recording, for generating a pulse signal at the time point when the levels of said first and second frequency signals coincide with each other, said pulse signal being used as a signal indicating that said rotary head has reproduced a predetermined position of the recording track pattern on the magnetic tape, and being used by said controlling means for controlling the relative positions of the reproduction scanning traces of said rotary head and the recording track;

said means for generating a pulse signal comprising a Schmitt circuit, a trapezoidal wave generator circuit supplied with an output of said Schmitt circuit, a waveform shaping circuit supplied with an output of said trapezoidal wave generator circuit, and an exclusive OR circuit supplied with an output of said waveform shaping circuit and an output of said Schmitt circuit, said Schmitt circuit being supplied with said tracking error signal so that the tracking control is effected by use of a pulse produced from said exclusive OR circuit, and when means operative during the reproduction process the magnetic tape is fed in reverse direction at a speed N times higher than that for recording to produce a reproduced image, for supplying the four pilot signals as reference signals in a sequence reverse to that for recording, the output pulse of said means for generating a pulse signal being frequency-divided into $1/(N+1)$, the frequency-divided signal being used by said controlling means for tracking control.

8. A helical scan magnetic recording and reproducing system comprising:

means operative during a recording period for sequentially recording with a rotary head four pilot signals of different frequencies, one for each field of a television signal, in superimposed relation with said television signal on a magnetic tape travelling at a first speed, such that the television signal of each field forms one recording track, a balanced modulator operative during a reproduction period involving said first tape speed for producing first and second frequency signals representing the frequency difference between reference signals and the pilot signals reproduced from the adjacent recording tracks on both sides of a main recording track to be reproduced, a comparator for forming a tracking error signal based on the level difference between said first and second frequency signals, means for controlling the relative positions of the recording track and the reproduction scanning traces of the rotary head by a tracking error signal, said system further comprising for fast forward and fast reverse reproduction:

means for supplying said four pilot signals, in a reverse order from the order in the recording process, to said balanced modulator as said reference signals, thereby to produce said tracking error signal from said comparator;

a pseudo CTL signal producing circuit for dividing the number of said pulse signals by $(N-1)$ in case of the fast forward reproduction and by $(N+1)$ in case of the fast reverse reproduction when a tape speed is N times the recording speed, thereby to produce a pulse signal divided for one field period; and a phase comparator circuit connected to said frequency-dividing circuit for comparing the pulse signal from said frequency-dividing circuit with a head switching signal with respect to phases thereof thereby to produce a phase error signal, said phase error signal being used to control a phase of the tape transfer.

* * * * *